Jan. 6, 1970     H. O. McINTIRE ET AL     3,488,576
FERROMAGNETIC BALL MAGNETIZER AND REMANENCE DETECTOR
Filed June 23, 1967     2 Sheets-Sheet 1
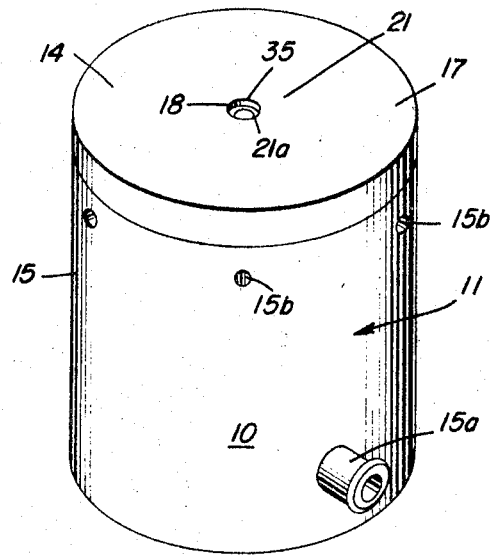
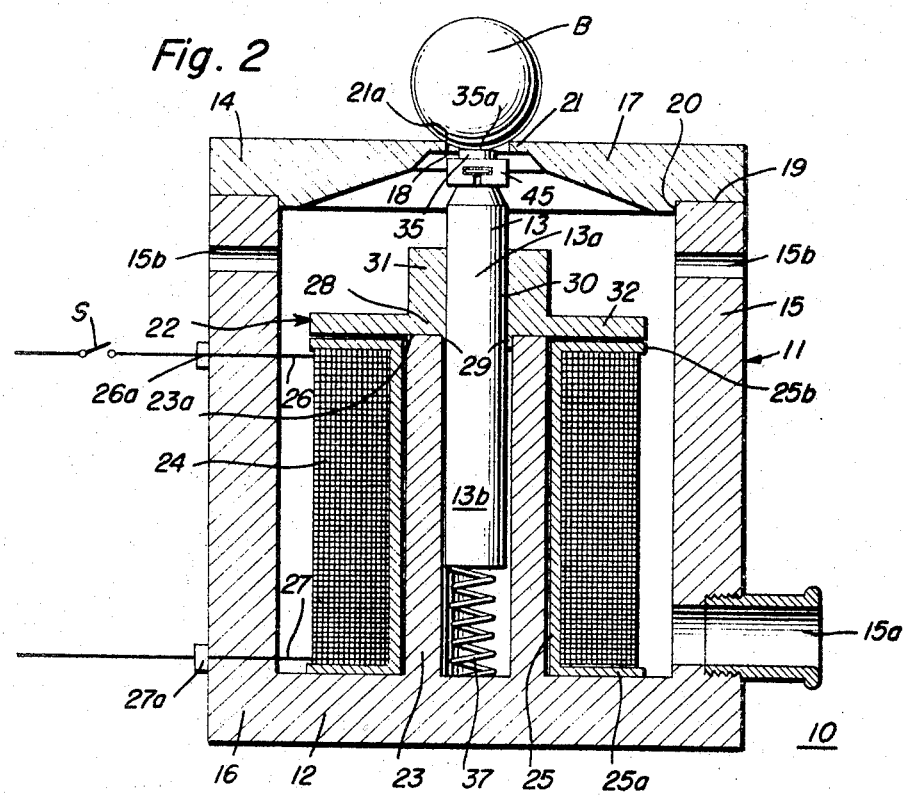
INVENTORS
HOY O. McINTIRE
HARVEY H. HUNTER
CLIFFORD L. SEALE
JOHN H. FLORA
BY *John B. Hermantrout*
ATTORNEY

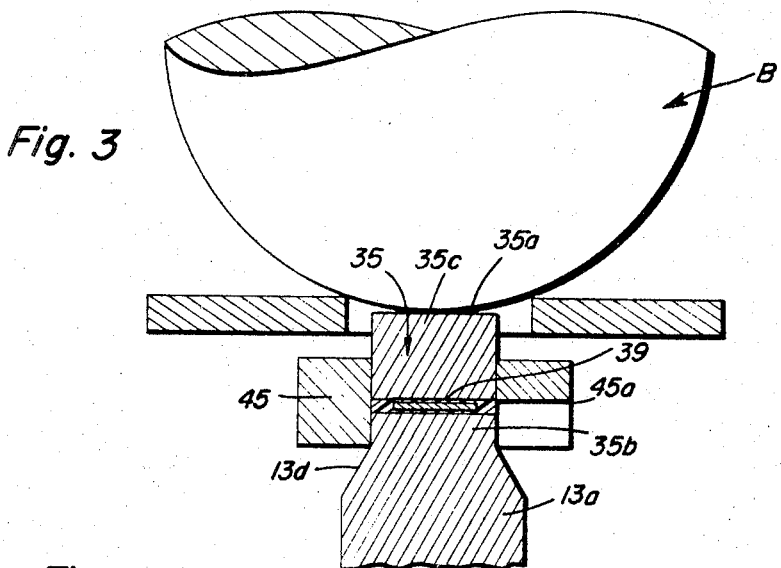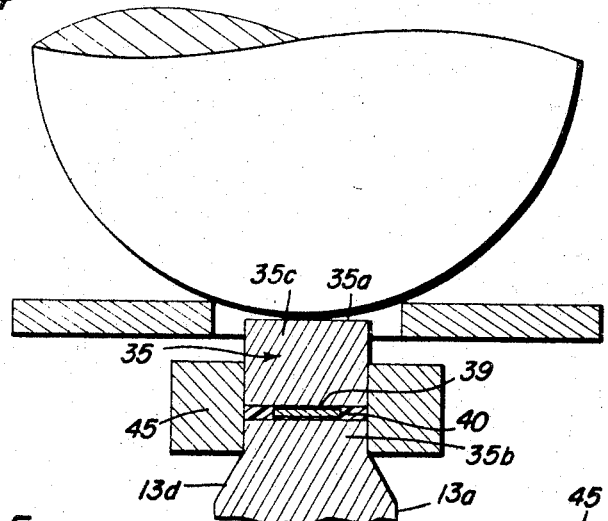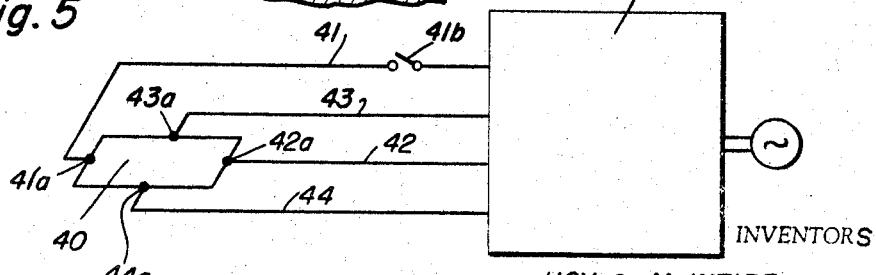

United States Patent Office 3,488,576
Patented Jan. 6, 1970

3,488,576
FERROMAGNETIC BALL MAGNETIZER AND REMANENCE DETECTOR
Hoy O. McIntire, Harvey H. Hunter, Clifford L. Seale, and John H. Flora, all of Battelle Memorial Institute, 505 King Ave., Columbus, Ohio 53201
Filed June 23, 1967, Ser. No. 648,379
Int. Cl. G01r 33/02
U.S. Cl. 324—34        11 Claims

ABSTRACT OF THE DISCLOSURE

Apparatus utilizing a core in association with a magnetizing winding and a residual magnete flux detector, affords magnetic poles of the core, and a ferromagnetic ball of any of different sizes in contact with the poles is magnetized within a magnetic circuit on electrical energization of the magnetizing winding, having the residual flux detector on energization, following electrical deenergization of the magnetizing winding, produce an output voltage value which is proportional to residual magnetic flux in the ball. The magnetic poles are arranged to occupy positions which are regionally within the same hemisphere of the ferromagnetic ball in the magnetic circuit and for any ferromagnetic ball of the same given size to be geometrically equivalently placed in the magnetic circuit.

BACKGROUND OF THE INVENTION

The present invention relates to electromagnetic testing apparatus and is more particularly concerned with magnetizing ferromagnetic balls and producing a voltage which includes a function that is proportional to residual magnetic flux in the ball.

In accordance with the present invention, electromagnetic apparatus is provided wherein opposed magnetic poles of a core of the apparatus relatively movably introduce geometrical relations to each other for a ferromagnetic ball of any of different sizes in contact with the poles within the same hemisphere of the ball to be in a magnetic circuit with the core. The poles moreover are arranged in their pattern of relative movement to product equivalent geometry of gap in accommodating any ferromagnetic ball of the same given size in the magnetic circuit. A magnetizing winding surrounds the core for inducing magnetic flux in the magnetic circuit upon being suitably electrically energized thus to magnetize a ferromagnetic ball in the magnetic circuit and for there to be residual magnetic flux in the ball after this winding has been electrically deenergized. Residual flux is the residual magnetic force in a ferromagnetic body after a magnetizing influence upon the body has been exerted and discontinued.

The present apparatus lends itself to operation under standardization of the manner in which residual flux is produced and detected in ferromagnetic balls of any of given sizes. Where like ferromagnetic material is magnetized, the ensuing residual flux corresponding to the material has a relationship to other properties such as hardness of the material; the greater the residual flux, the higher the hardness. There is a residual flux detector in the present apparatus and this detector has an equivalent geometrical position with reference to any ball selected from balls of like size and placed in the magnetic circuit. The residual flux detector on being electrically energized at a given level of energization is capable of producing an output voltage value which is proportional to residual flux in a ferromagnetic ball which has been magnetized and still is in the magnetic circuit. The output voltage value is one which fairly is comparable to other such voltage values obtained after magnetization of ferromagnetic balls in the apparatus, as for example where the voltage values were noted following like levels of magnetization of ferromagnetic balls from a heat treated batch of like size and material. Illustratively, the present invention has application in testing steel balls for hardness such as balls used in the well known ball-milling operation or for ball bearings.

IDENTIFICATION OF THE DRAWINGS

While the specification concludes with claims particularly pointing out and distinctly claiming the subject matter which we regard as our invention, it is believed that the invention will be better understood from the following description with reference to an illustrative embodiment thereof represented in the following drawings in which:

FIGURE 1 is a perspective view of an electromagnetic apapratus for ferromagnetic balls to be magnetized and be in a residual magnetic flux sensitive magnetic circuit;

FIGURE 2 is a vertical elevation in section taken in the plane of 2—2 in FIGURE 1 and representing position of a ball on the apparatus;

FIGURE 3 is a detail representing the magnetic poles and a residual flux detector of the apparatus of FIGURES 1 and 2 in section and in affiliation with a ball in position on the poles;

FIGURE 4 is similar to FIGURE 3, the section being at right angles to the section represented in FIGURE 3; and FIGURE 5 is a diagrammatic representation of the residual flux detector in the apparatus in the preceding figures, having the detector associated with a gaussmeter in order to give an example of certain auxiliary equipment with which the apparatus may be used.

Referring now more particularly to FIGURES 1 and 2 of the accompanying drawings, an electromagnetic apparatus, designated in general by the reference numeral 10, is represented and includes a magnetic core 11 wherein a first core portion 12 and a plunger 13 are provided for the core 11 to form a magnetic circuit with a ferromagnetic ball of any of different classes as to size. Core 11 is constructed mainly of a low coercive force material such as Armco ingot iron. The core portion 12 comprises a generally cylindrical housing 14, the side wall 15 of which is integral with a base or bottom 16 and is associated with a closure or top 17 of the housing. Top 17 is suitably fixed in position to the side wall 15, having an annular face 19 resting upon a conforming end face of the side wall and an annular step 20 projecting adjacent to the inside face of this wall. An approximately circular opening 18, disposed substantially centrally of top 17, extends through a first magnetic pole or terminal 21 of the core means 11 from a first side of the core means exteriorly of the housing 14 to a second side of the core means interiorly of the housing. Magnetic pole 21 is formed by a relatively thin portion of the top 17, in an annular region bordering the opening 18, and the pole provides a seat 21a, which peripherally is substantially circular at intersection with a plane and is exposed outside the housing 14 for a ferromagnetic ball of any of different classes as to size to be seated and have a minor surface area exposed through opening 18 rearwardly of the seat. Radially outwardly from the magnetic pole 21, the thickness of the top 17 progressively increases to the region of the annular step 20.

A projection 22 of the core portion 12 includes an extension 23 located inside the housing 14 centrally of the bottom 16 and integral with the bottom. A magnetizing winding 24 of the apparatus 10 is on a spool 25 which is centrally received in interfit with the outer face of the extension 23, having one end flange 25a of the spool seated upon the inside face of the housing bottom 16. The opposite lead ends 26 and 27 of the winding 24 have terminals 26a and 27a mounted on the side wall 15 and accessible externally of the housing 14 for connection with a source of direct current electrical supply for the apparatus 10 to be energized in a manner which will be explained more fully hereinafter.

Projection 22 of the core portion 12 further comprises an end disc 28 seated suitably fixed in position upon the abutting end 23a of the extension 23 and having a cylindrical lip 29 inserted in interfit with the face of the exetnsion inside the hollow of the extension. The end disc 28, within aperture 30 therein, is substantially cylindrical coaxially with the pole opening 18, the aperture 30 being through a relatively thick mid portion 31 of the disc and extending inside the cylindrical lip 29. An annular flange 32 of the disc, integral with the mid portion 31, and of reduced thickness coextends with the second end flange 25b of spool 25 substantially in contact therewith for maintaining the spool and magnetizing winding 24 in position.

A second magnetic pole or terminal 35 of the core 11 comprises a reduced, substantially cylindrical first longitudinal end of the plunger 13. A substantially cylindrical intermediate portion 13a of the plunger is of larger diameter than the magnetic pole 35, is integral with base portion 35b of this pole (see FIGURES 3 and 4) through a conically tapering transition portion 13d, and is coaxial with the cylinder of pole 35. Base portion 35b and a tip portion 35c of the pole 35 are offset one from the other axially of the plunger 13 and as will be more fully described hereinafter are secured together in this condition.

End 13b of the plunger is received within the hollow of the extension 23, and the intermediate portion 13a has guided contact within the aperture 30 with the disc 28, for the plunger 13, being longitudinally moved, or in a set position in contact with a ball of any of different sizes seated on seat 21a of the magnetic pole 21, to maintain the axis of the cylinder of the magnetic pole 35 substantially coaxial with opening 18 and the seat 21a. End face 35a of the magnetic pole is planar and remains substantialy parallel to a plane of a circle of the seat 21a.

Further, in the present embodiment, the magnetic pole 35, in cross section, is appreciably smaller in area than the area of the opening 18. Pole 35, by axial movement of the plunger 13, can take an initial position in the latter opening and thus form an annular gap with the magnetic pole 21. The plunger 13 is biased for pole 35 to occupy the aforementioned initial position, a very simple form of one of various possible biasing means for the plunger being represented by the helical spring 37. This spring is situated within the hollow of the extension 23 and has opposite ends respectively against the bottom of the hollow and against end 13b of the plunger with a force for the plunger and thus the pole 35 to seek the initial position.

It will therefore be appreciated that the magnetic pole 35 is relatively movably connected with the magnetic pole 21 to preserve an alignment with the opening 18, and for the pole 35 relatively moved to place geometrically equivalently any ferromagnetic ball of like size seated on the seat 21a in a magnetic circuit with the core 11. Equivalent geometrical regions of ferromagnetic balls of like size enter the magnetic circuit between the poles 21 and 35 in the sequence of replacing one such ball on the seat with another. The seated ball has contact with the magnetic pole 35 under thrust of the spring 37 exerted upon the plunger 13. When the ball is removed from seat 21a the initial position of the plunger is resumed. The plunger moves from the initial position against the bias of spring 37 by an amount depending upon size of the ball which is brought into position on the seat 21a and into contact with pole 35.

The plunger 13 carries a residual flux detector between discrete magnetic portions of the plunger, having the residual flux detector within a magnetically inert region 39 (see FIGURES 3 and 4) which extends throughout a full transverse section of the plunger. The residual flux detector in the present embodiment is in the form of a Hall effect device 40 which includes a wafer situated between the base or rearward portion 35b and the tip or forward portion 35c of magnetic pole 35 and accordingly rearwardly of and proximate to end face 35a of this magnetic pole. The wafer is embedded in a magnetically inert potting substance, such as an epoxy material and furthermore is bonded by the potting substance to the adjacent ends of the pole portions 35b and 35c inside a magnetically inert collar 45, the latter being made for example of brass. The magnetically inert collar or connector 45 is disposed on the pole 35 and is secured to the sides of the pole base portion 35b and pole tip portion 35c such as by means of a bonding material of the same composition as the potting substance. Plunger 13 accordingly has the wafer within the magnetically inert region 39. The wafer in its installed position intersects the magnetic flux path afforded by the plunger 13, having the longitudinal axis of the magnetic pole 35 about normal to the plane of the wafer or having the plane of the wafer otherwise within the brunt of the flux path just mentioned.

The Hall effect device 40 is illustratively of the BH–200 type manufactured by F. W. Bell, Incorporated, of Columbus, Ohio, this being a thin rectangular wafer of high purity indium arsenide. Referring further to the Hall effect device 40, and to FIGURE 5, a first pair of electrical leads 41 and 42 are attached respectively at input terminals 41a and 42a on the opposite shorter sides of the wafer, and a second pair of electrical leads 43 and 44 are attached respectively at output terminals 43a and 44a on the opposite longer sides of the wafer. A notch 45a in the collar (see FIGURE 3) allows egress for the leads 41, 42, 43 and 44 from the plunger 13. The collar is of a radial extent for an outer end face 45b thereof to contact the inside surface of top 17 in the hereinbefore described initial position of the plunger 13. This initial position is in fact maintained under bias of the spring 37, having the collar act as a stop in contact with the top 17 against further outward movement of the plunger.

When leads 41 and 42, and therefore the terminals 41a and 42a, are connected with a source of an electrical control current, the control current passes through the long dimension of the wafer, and a voltage which is directly proportional to the control current and the magnitude of the flux vector which is at right angles to the plane of the wafer appears across the output terminals 43a and 44a. The residual flux in a ferromagnetic ball on seat 21a, in view of the position of the wafer of the Hall effect device 40 on the plunger 13, has a vector which is normal to the plane of the wafer, and through controlling the manner in which the wafer is electrically energized at input terminals 41a and 42a to have the control current represent a constant, the output voltage of the Hall effect device, across output terminals 43a and 44a, includes a voltage value which is proportional to the residual flux in the ferromagnetic ball in the magnetic circuit of apparatus 10.

A gaussmeter is readily used with the apparatus 10 to indicate the magnitude of the output voltage of the residual flux detector in terms of gauss. The gaussmeter 45 illustrated in FIGURE 5 is connected with electrical supply and with leads 41, 42, 43 and 44 to the Hall effect device 40 and may for example be Model 120 manufactured by F. W. Bell Incorporated, of Columbus, Ohio. The latter meter operates on 117 volt alternating current and feeds a control current representing a constant across the input terminals 41a and 42a of the wafer and also measures the output voltage across terminals 43a and 44a in terms of gauss.

The housing 14 (FIGURES 1 and 2) has an inlet 15a and a plurality of outlets 15b through the side wall 15 thereof for air or other suitable gas to be supplied under pressure as a coolant through the interior of the housing from a pressurized source and thus maintain the apparatus 10 at a reduced operating temperature.

For electrically energizing the magnetizing winding 24, the terminals 26 and 27 of the winding are connected with a source of direct current supply under control of an on-off switch 48 shown in FIGURE 2. Preferably, the electrical supply to the winding 24 is a pulsating direct current supply having a substantially constant pulsation rate of anywhere from about 20 to about 30 pulses per minute while a ferromagnetic ball is being magnetized in the apparatus 10. Certain ferromagnetic materials are notoriously difficult to magnetize and this difficulty usually increases with the actual physical hardness of the ferromagnetic material. The use of the aforementioned pulsation rate in the electrical supply to the winding 24 promotes more favorable reproducibility of test results, and lends ease to magnetizing a ferromagnetic ball particularly where the ferromagnetic material of the ball includes one of those materials which ordinarily is quite difficult to magnetize.

Assuming now that the switch 48 is open, therefore having the magnetizing winding 24 electrically deenergized, and assuming further that the gaussmeter 45 is electrically energized having switch 41b in lead 41 closed, the gaussmeter provides control current which correlates as a constant with reference to voltage appearing across the output terminals 43a and 44a of the Hall effect device 40. For zeroing the apparatus 10 with reference to magnetism which may be inherent, the plunger 13 is advantageously set to a geometrical position with respect to pole 21 which is equivalent to that to be occupied by the plunger when in contact with a ferromagnetic ball on the seat. This setting suitably is accomplished by placing on seat 21a a magnetically inert ball, such as of wood, of the same size as a ferromagnetic ball which is to be tested. Under these conditions a reading is taken from the gaussmeter 45 or the gaussmeter otherwise is in effect substantially zeroed for ruling out the value of the voltage appearing across the output terminals 43a and 44a of the Hall effect device 40, the voltage being attributed to inherent magnetism of the apparatus 10. An alternative practice involves omitting a ball from the seat 21a and accordingly having the reference position of the plunger in the zeroing be the aforementioned initial position of the plunger.

After the gaussmeter has been zeroed a ferromagnetic ball which is intended for test then is seated on seat 21a and thus is in contact with the magnetic poles 21 and 35. With switch 48 in closed position, the magnetizing winding 24 becomes electrically energized, inducing magnetic flux in the magnetic circuit of the ferromagnetic ball and core 11. During this time the Hall effect device 40 advantageously remains electrically energized across the input terminals 41a and 42a for the gaussmeter to detect peak magnetization of the ferromagnetic ball. After the ferromagnetic ball has become magnetized, the switch 48 is opened to electrically deenergize the magnetizing winding 24, and with the Hall effect device electrically energized at the input terminals 41a and 42a, the voltage across the output terminals 43a and 44a then is inclusive of a voltage value which is proportional to residual magnetic flux in the magnetized ball and is detected by the gaussmeter 45. Considering that the apparatus 10 has been zeroed out for inherent magnetism, a reading in gauss obtained from the gaussmeter may be interpreted in terms of residual magnetic flux in the ball. The gauss readings, being compensated for inherent magnetism of the apparatus 10, are indicative of relative hardnesses of ferromagnetic balls, such as hardnesses at or in regions near the surfaces of the balls. During magnetization of the ball and the ensuing reading of the gaussmeter for the residual flux determination it is quite important that the ferromagnetic ball be kept in a fixerd position relative to the poles 21 and 35, for otherwise errors accrue from movement. Of course, a test on a single ferromagnetic ball may be repeated through use of the apparatus 10, illustratively for averaging the results of the several tests. In these operations different areas of the ferromagnetic ball, each centered about 90° apart, may for example be exposed, one for each test, through the opening 18, having the ball in the magnetic circuit throughout the test.

An example of details in accordance with the present invention is had through considering the instance where the opening in pole 21 and the diameter of pole 35 were made respectively to be about 0.5 inch and 0.375 inch, having these dimensions correlated with 200 turns of #14 wire in the magnetizing winding 24 and a direct current of 15 amperes pulsating at a constant rate of anywhere from about 20 to 30 pulses per minute for energizing the winding. Under these conditions the magnetic flux in the balls reached sufficient levels for the measurement purpose, even where the ball introduced in the magnetic circuit was of a diameter of slightly more than 0.5 inch and the air gap condition presented by the relatively small ball at the magnetic poles thus was relatively severe.

While considerable emphasis has been placed upon use of the apparatus of this invention for testing ferromagnetic balls, it will clearly be understood that the apparatus also may have utility for testing ferromagnetic materials in other forms than balls.

As the many possible embodiments of the invention may be made and as many possible changes may be made in the embodiments hereinbefore set forth, it will be distinctly understood that all matter described herein is to be interpreted as illustrative and not as a limitation.

We claim:

1. In electromagnetic apparatus for magnetizing a ferromagnetic ball and sensing residual magnetic flux in the ball, the combination which includes, a magnetic core comprising first magnetic core means and magnetic plunger means wherein a magnetic flux path extends, said first magnetic core means having a first magnetic terminal of said magnetic core and said first magnetic terminal including magnetic contact structure of said first magnetic core means in said magnetic flux path, said magnetic contact structure being on a first side of said first magnetic core means and disposed circularly about an opening leading through said first magnetic core means from said first side to a second side of said first magnetic core means for said magnetic contact structure to seat a ferromagnetic ball of any of different classes as to ball size into an indexed position, and said magnetic plunger means having a second magnetic terminal of said magnetic core and said second magnetic terminal including a magnetic contact end of said magnetic plunger means in said magnetic flux path, a magnetizing winding on said magnetic core for inducing magnetic flux in said magnetic flux path, a Hall effect wafer, and non-magnetic interconnecting means securing inner magnetic ends of said magnetic core together in said magnetic flux path with said Hall effect wafer extending between said inner magnetic ends and in a fixed position relative to one of said magnetic terminals, said first magnetic core means and said magnetic plunger means being relatively movably connected magnetically between said Hall effect wafer and the other of said magnetic terminals having said second side of said first magnetic core means toward said relatively movable connection for said magnetic contact end and said magnetic contact structure on operation of said relatively movable connection to be moved relative to each other to any one of a number of geometrical substantially equivalently restorable relative positions having said magnetic contact end in the position in an air-gap forming relation with said magnetic contact structure, magnetically between said magnetic contact structure and said relatively movable connection, and having said air-gap lead widthwise in said opening to differ in width as said relative positions differ, whereby a magnetizing circuit to be energized by said magnetizing winding and having sad Hall effect wafer present for sensing residual magnetic flux is had by placing a ferromagnetic ball of any of different classes as to ball size in indexed position on said magnetic contact structure and in contact with said magnetic contact end, with the resulting relation of said magnetic contact end, said magnetic contact structure and said Hall effect wafer differing with ball size and being substantially equivalently restored by having a subsequent ball of the same size as before accommodated on said magnetic contact structure and against said magnetic contact end.

2. In electromagnetic apparatus, the combination as set forth in claim 1 wherein biasing means is interposed between said relatively movably connected first magnetic core means and magnetic plunger means and exerts thrust in favor of said magnetic plunger means being farther toward said first side of said first magnetic core means in a direction leading from said second side toward said first side when said magnetic contact end of said magnetic plunger means is in contact with a ferromagnetic ball of any of different classes as to ball size seated upon said magnetic contact structure.

3. In electromagnetic apparatus, the combination as set forth in claim 2 wherein said relatively movable connection connects said first magnetic core means and said magnetic plunger means for said magnetic contact end and said magnetic contact structure in their relative movement and said opening to be substantially coaxial.

4. In electromagnetic apparatus, the combination as set forth in claim 1 wherein said magnetic contact structure of said first magnetic core means is external structure of a housing for said magnetic plunger means, and said opening through said first magnetic core means leads into the inside of said housing toward said magnetic contact end of said magnetic plunger means.

5. In electromagnetic apparatus for magnetizing a ferromagnetic ball and sensing residual magnetic flux in the ball, the combination which includes, relatively movably connected plunger and magnetic core means for inducing magnetic flux in said magnetic flux path, said plunger and magnetic core means including first magnetic core means having magnetic contact structure in said magnetic flux path, and a plunger, said plunger comprising forward and rearward magnetically conductive components and a magnetic contact end of said plunger on said forard component, a Hall effect wafer, and non-magnetic interconnecting means securing said forward and rearward components together in said magnetic flux path with said Hall effect wafer extending between said forward and rearward components and in a fixed position relative to said magnetic contact end, said magnetic contact structure being on a first side of said first magnetic core means and disposed circularly about an opening leading through said first magnetic core means from said first side to a second side of said first magnetic core means for said magnetic contact structure to seat a ferromagnetic ball of any of different classes as to ball size into an indexed position, and said second side of said first magnetic core means being toward said relatively movable connection with the latter connecting said first magnetic core means with said rearward component of said plunger for said magnetic contact end and said magnetic contact structure on operation of said relatively movable connection to be moved relative to each other to any one of a number of geometrical substantially equivalently restorable relative positions having said magnetic contact end in the position in an air-gap forming relation with said magnetic contact structure, magnetically between said magnetic contact structure and said relatively movable connection, and having said air-gap lead widthwise in said opening to differ in width as said relative positions differ, whereby a magnetizing circuit to be energized by said magnetizing winding and having said Hall effect wafer present for sensing residual magnetic flux is had by placing a ferromagnetic ball of any different classes as to ball size in indexed position on said magnetic contact structure and in contact with said magnetic contact end with the resulting relation of said magnetic contact end, said magnetic contact structure and said Hall effect wafer differing with ball size and being substantially equivalently restored by having a subsequent ball of the same size as before accommodated on said magnetic contact structure and against said magnetic contact end.

6. In electromagnetic apparatus, the combination as set forth in claim 5 wherein biasing means is interposed between said first magnetic core means and said plunger and exerts thrust in favor of said plunger being farther toward said first side of said first magnetic core means in a direction leading from said second side toward said first side when said magnetic contact end of said plunger is in contact with a ferromagnetic ball of any of different classes as to ball size seated upon said magnetic contact structure, and said relatively movable connection connects said rearward magnetically conductive component of said plunger with said first magnetic core means for said magnetic contact end and said magnetic contact structure in their relative movement and said opening to be substantially coaxial.

7. In electromagnetic apparatus, the combination as set forth in claim 6 wherein said relatively movable connection includes a telescopically engaged pair of inner and outer magnetic portions, one of the pair being a portion of said rearward component of said plunger and the other of said pair being a portion of said first magnetic core means, there being an end of said inner magnetic portion inside said outer magnetic portion, and said biasing means includes a spring inside said outer magnetic portion, said spring acting upon said end of said inner magnetic portion and being supported for urging relative movement of said plunger and said first magnetic core means on thrust of said spring.

8. In an electromagnetic apparatus, the combination as set forth in claim 7 wherein said magnetizing winding surrounds said outer magnetic portion in a fixed position relative to said outer magnetic portion, the latter being a portion of said first magnetic core means.

9. In electromagnetic apparatus, the combination as set forth in claim 6, wherein said magnetic contact structure of said first magnetic core means is external structure of a housing for said plunger, and said opening leads into the inside of said housing toward said magnetic contact end of said plunger.

10. In electromagnetic apparatus, the combination as set forth in claim 9, wherein said relatively movable connection includes a magnetic extension of said first magnetic core means inside said housing and said magnetic extension is telescopically engaged with said rearward magnetically conductive component of said plunger, and said magnetizing winding is inside said housing and surrounds said magnetic extension in a fixed position relative to said magnetic extension.

11. In electromagnetic apparatus, the combination as set forth in claim 10 wherein said biasing means includes a spring and said magnetic extension is hollow receiving said spring and an end of said rearward magnetically conductive component of said plunger in said hollow, said spring acting upon said end of said rearward magnetically conductive component and upon said first magnetic core means for urging relative movement of said plunger and said first magnetic core means on thrust of said spring.

References Cited

UNITED STATES PATENTS

| | | | |
|---|---|---|---|
| 2,295,382 | 9/1942 | Brace | 324—37 |
| 2,794,951 | 6/1957 | Broding et al. | 335—284 |
| 3,016,487 | 1/1962 | Foley | 324—38 |
| 3,281,666 | 10/1966 | Makino | 324—34 |

FOREIGN PATENTS

| | | |
|---|---|---|
| 866,570 | 4/1961 | Great Britain. |
| 936,015 | 9/1963 | Great Britain. |
| 1,403,958 | 5/1965 | France. |

OTHER REFERENCES

Diamond, Milton J.: Hardness Tester Sorts Auto Engine Parts, Electronics; December 1954, pp. 160–161.

RUDOLPH V. ROLINEC, Primary Examiner

R. J. CORCORAN, Assistant Examiner

U.S. Cl. X.R.

317—157.5; 335—284